United States Patent [19]
Mizobe

[11] Patent Number: 5,641,219
[45] Date of Patent: Jun. 24, 1997

[54] UNIFORM ILLUMINATION LIGHT EMITTING DEVICE

[76] Inventor: Tatsuji Mizobe, 1-21-3, Sugano Ichikawa-shi, Chiba-ken, Japan

[21] Appl. No.: 480,929

[22] Filed: Jun. 7, 1995

Related U.S. Application Data

[63] Continuation of Ser. No. 154,384, Nov. 18, 1993, abandoned, which is a continuation of Ser. No. 895,011, Jun. 8, 1992, abandoned, which is a continuation-in-part of Ser. No. 810,421, Dec. 20, 1991, Pat. No. 5,249,104, which is a continuation-in-part of Ser. No. 547,163, Jul. 3, 1990, abandoned, which is a continuation-in-part of Ser. No. 541,944, Jun. 22, 1990, Pat. No. 5,057,974.

[51] Int. Cl.$^6$ ....................................................... F21V 8/00
[52] U.S. Cl. ................................................ 362/31; 362/26
[58] Field of Search .................................. 362/26, 31, 223

[56] References Cited

U.S. PATENT DOCUMENTS

| | | | |
|---|---|---|---|
| 1,759,782 | 5/1930 | Fox | 362/31 |
| 3,752,974 | 8/1973 | Baker et al. | 362/31 |
| 4,373,282 | 2/1983 | Wragg | 362/31 |
| 4,418,378 | 11/1983 | Johnson | 362/223 |
| 4,729,068 | 3/1988 | Ohe | 362/31 |
| 4,779,166 | 10/1988 | Tanaka et al. | 362/31 |
| 4,890,201 | 12/1989 | Toft | 362/31 |
| 4,965,950 | 10/1990 | Yamada | 362/31 |
| 4,985,809 | 1/1991 | Matsui et al. | 362/31 |
| 5,057,974 | 10/1991 | Mizobe | 362/31 |
| 5,093,765 | 3/1992 | Kashima et al. | 362/31 |
| 5,178,447 | 1/1993 | Murase et al. | 362/31 |

*Primary Examiner*—Y. My Quach
*Attorney, Agent, or Firm*—Cushman Darby & Cushman, IP Group of Pillsbury Madison & Sutro LLP

[57] ABSTRACT

An illuminating device is disclosed in which light is introduced mainly from a light source provided at a peripheral portion of a light emitting surface thereby illuminating the light emitting surface. The illumination of the light emitting surface is kept uniform irrespective of a shape of the light emitting surface, a type of the light source, a number of light sources and a mounting position of the light sources. The device may be used as a display device.

8 Claims, 3 Drawing Sheets

FIG. 1
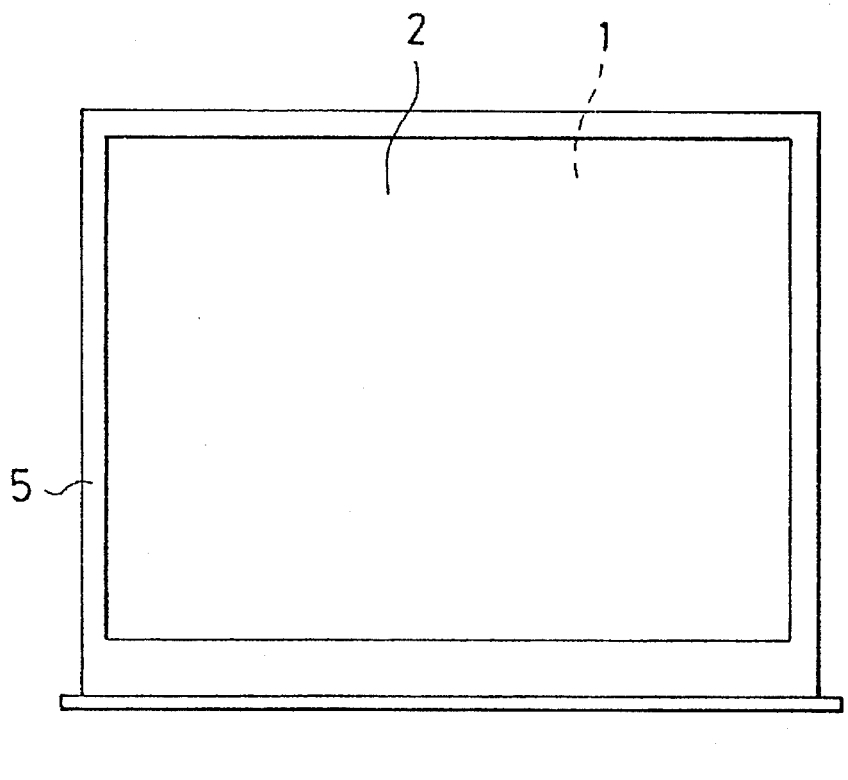
FIG. 2
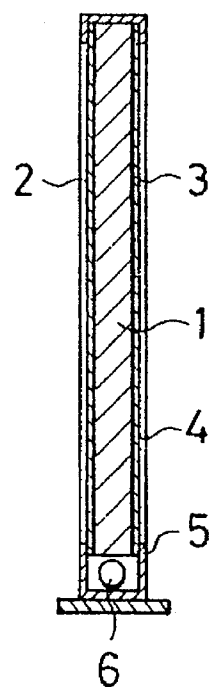
FIG. 3
| A1 | B1 | C1 | D1 |
| --- | --- | --- | --- |
| A2 | B2 | C2 | D2 |
| A3 | B3 | C3 | D3 |
| A4 | B4 | C4 | D4 |

UNIFORM ILLUMINATION LIGHT EMITTING DEVICE

This application is a continuation of application Ser. No. 08/154,384, filed on Nov. 18, 1993, which was abandoned upon the filing hereof, which is a Continuation of application Ser. No. 07/895,011, filed on Jun. 8, 1992, now abandoned, which is a Continuation in Part of application Ser. No. 07/810,421, filed Dec. 20, 1991, now U.S. Pat. No. 5,249,104, which is a Continuation in Part of application Ser. No. 07/547,163, filed Jul. 3, 1990, now abandoned, which is a Continuation in Part of application Ser. No. 07/541,944, filed Jun. 22, 1990, now U.S. Pat. No. 5,057,974.

BACKGROUND OF THE INVENTION a. Field of the invention

The present invention relates to a planar light emitting device or a planar illuminating device used for illuminating an advertisement, a signboard, a billboard, a guideboard, or the like. More particularly, the invention relates to a planar light emitting device having a uniform illumination over the entire light emitting device.

b. Description of the Related Art

Recent light emitting devices require a light emitting board having a thin thickness, and various kinds of illumination sources such as fluorescent lamps, light emitting diodes, incandescent lamps or the like are used to illuminate the light emitting devices. In many cases, the light sources are mounted on peripheral portions of the light emitting board. There is a strong need to illuminate the light emitting surface in a uniform manner. More specifically, light is introduced in a direction perpendicular to the light emitting surface from the peripheral portion of the light emitting board to thereby illuminate the light emitting surface. Since the light is introduced into the light emitting surface in a direction perpendicular to the light emitting surface from the peripheral portion of the light emitting board, it is very difficult to uniformly illuminate the light emitting surface due to the types of the light sources used for illumination and due to the number and the mounting position of the illumination tools.

The present inventor filed U.S. patent application Ser. No. 07/541,944 (now U.S. Pat. No. 5,057,974) to propose one countermeasure to this problem. According to the proposed method of that application, a reflecting member composed of a large number of reflecting units in the form of dots or lines with a density inversely proportional to a square of the distance as measured from each light source is provided under a lower surface of the light emitting surface, whereby the light reflected from the opposite surface is reflected by the reflecting units to uniformly illuminate the light emitting surface. The proposed method is suitable for a simple case where light sources for uniformly illuminating the object are used; however, there are still other difficulties involved in uniformly illuminating the object. In various cases, it is very difficult or sometimes impossible to provide dots or parallel lines with a density which is inversely proportional to the square of the distance from each light source due to the fact that the light sources are locally positioned at a peripheral portion of the light emitting surface and due to a deformed transparent substrate, the number, the type and the mounting position of the light sources. Also, even if the dots or parallel lines having a density inversely proportional to a square of the distance from the light sources are made, it sometimes would be impossible to illuminate the light emitting surface in a uniform fashion. For example, as shown in FIG. 3, when a linear, straight fluorescent lamp is provided on one side surface of the light emitting surface, the illumination of the central part of the fluorescent lamp is high, whereas the illumination of the end parts of the fluorescent lamp is low. Accordingly, it is difficult or impossible to illuminate the light emitting surface in a uniform fashion only by providing light reflecting surfaces composed of a large number of dots or lines having a distribution density inversely proportional to the square of the distance from each light source.

In order to solve this problem, the present inventor filed U.S. patent application Ser. No. 07/519,173 (now U.S. Pat. No. 5,138,782) and U.S. patent application Ser. no. 07/810,421. These applications are related to an improvement of the uniform illumination by providing a thin diffusion plate on the top surface of the light emitting surface. These methods would not be effective for the specific condition, since these methods still suffer from the problem that due to the shape of the light emitting surface of the light emitting device, the type and position of the light sources, or the irregularly reflected light from the reflection surface of the side walls of the light emitting device, a bright portion is generated in the light emitting surface even in a position remote from the light sources, whereas a dark portion is generated even at a position close to the light sources, resulting in the formation of illumination spots. Thus, even with the methods proposed in the applications, it would be difficult to obtain uniform illumination over the light emitting surface, and it would be safe to say that these methods would not bring about a satisfactory result.

SUMMARY OF THE INVENTION

In order to overcome these problems, according to the present invention there is provided a planar light emitting board characterized in that light emitting objects are prepared on the portion of the surface opposite the weak emitting portion of the board having a distribution density inversely proportional to the illuminance (intensity of the illumination) at each position of the light emitting surface of the board. Therefore, the board can have a uniform illumination of the light emitting surface by using light reflective objects drawn in opaque liquids (i.e., special inks or coating paints) having a high light reflectivity, or which are rough surfaces (i.e., having depressions of 0.01–2 mm) or many narrow and shallow grooves formed by using dies or other mechanical means, or small metal pieces or metallic film or the like having a high coefficient of reflectivity.

Therefore, a planar light emitting device according to the present invention comprises a light transmissive substrate made of transparent material with a predetermined exterior shape; light sources (i.e., fluorescent lamps, light emitting diodes or incandescent lamps) for introducing light into said light transmissive substrate; a light reflective layer provided around a periphery of the light transmissive substrate for preventing leakage of light; light reflective objects disposed on the surface opposite the light emitting surface of the substrate having a distribution density inversely proportional to the illuminance at each position of the rear surface of the substrate; and a light reflecting plate or sheet for covering rear surfaces of said light reflective objects.

BRIEF DESCRIPTION OF THE DRAWINGS

In the accompanying drawings:

FIG. 1 is a front view showing an illuminating device in accordance with an embodiment of the invention;

FIG. 2 is a longitudinal sectional view showing the device shown in FIG. 1;

FIG. 3 is a diagram showing an example of the division of the light emitting surface of the illuminating device shown in FIG. 1;

DESCRIPTION OF THE PREFERRED EMBODIMENTS

Figure 4:
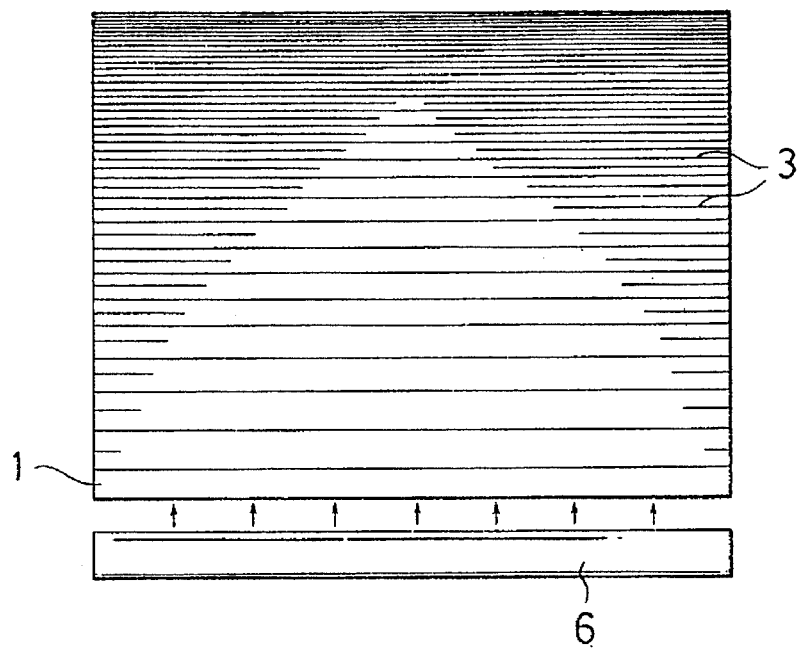
FIG. 4 is a view showing light reflective objects in the form of a plurality of lines on a back surface of the light emitting surface of the illuminating device shown in FIG. 1.

The present invention will now be described by way of example with reference to the accompanying drawings.

FIGS. 1 to 4 show a first embodiment of the invention. In this embodiment, there is shown a desk-top type illuminating device having a rectangular light emitting surface. A substrate which is a main body having a light emitting surface is composed of a relatively thin plate which is made of transparent resin such as acrylic resin having high light transmissivity. A fluorescent lamp 6 is provided as a light source at a peripheral portion of the substrate 1 as shown in FIG. 2. Reflecting layers for blocking leakage of light and reflecting light into the substrate are provided around the periphery of the substrate except for a portion of the substrate where light is introduced from the light source. The reflecting layers may be formed of a frame member 5 for supporting and fixing the substrate 1, by applying an opaque coating having a high reflectivity onto the periphery of the substrate 1, or by attaching a metallic sheet such as aluminum having a high coefficient of reflectivity, and the reflecting layers can prevent leakage of the light from the substrate 1. It is preferable to apply a thin transparent sheet or plate 2 or a coating layer 2 made of transparent resin such as a fluororesin having a reflective index lower than that of the material of the substrate 1 on the emitting surface of the substrate 1 for keeping light in the substrate 1.

Light reflective objects 3 having a high coefficient of reflectivity are applied to a rear surface of the substrate opposite the light emitting surface for the purpose of adjusting a quantity of reflected light to make illumination of the light emitting surface uniform as described in detail later. A light reflecting plate 4 or light reflecting sheet 4 such as a white plastic sheet 4 covers a rear surface of the light reflective objects 3 for reflecting light in a direction perpendicular to the light emitting surface for emitting light from the light emitting surface.

Since the light transmissive substrate is thus formed, and even if no transparent sheet or plate 2 is applied on the emitting surface of the substrate 1, the light introduced from the side surface of the substrate 1 is advanced while reflecting obliquely with respect to the light emitting surface. As a result, the light is repeatedly reflected within the substrate 1 and advanced through the substrate, while the light perpendicular to the light emitting surface is only emitted from the light reflected by reflecting plate or sheet 4.

The light emitting surface of the substrate 1 was divided in a predetermined manner as shown in FIG. 3. The illumination at each section (i.e., A1, A2, ... B1, B2 .... C1 .... ) was measured by means of a luminous meter. In view of the measurement results, in order to uniformly illuminate the light emitting surface, if an illumination at a certain position is low and it is necessary to increase the illumination at the position, the distribution density of the light reflective objects 3 which are in the form of a plurality of dots (i.e., small circles having a diameter of about 5 mm or less or small regular squares or the like) or a plurality of lines which are formed opposite the weak illumination position by a suitable method in which liquid having a high coefficient of reflectivity under dry conditions (i.e., a special ink or coating or the like) is applied, or a metallic sheet having a high coefficient of reflectivity is attached. Also, the objects may be substituted by rough surfaces with depressions having a depth of 0.01–2 mm or many narrow and shallow grooves formed by using a die or other mechanical means on the surface positions corresponding to the weak illumination positions. If the density of the light reflective objects is increased, the quantity of reflected light is increased so that the illumination of the light emitting surface corresponding to the position is increased to thereby keep illumination of the entire light emitting surface of the substrate 1 uniform.

In general, the illumination of the central portion of the fluorescent lamp is higher than that of the end portions thereof. Namely, the illumination gradient or distribution of the emitting surface is in the form of a mountain-like shape having a bottom at the light source 6, and the lowest illumination is at both side portions which are remote from the light source 6. Accordingly, if the light reflective objects 3 for keeping the illumination distribution of the light emitting surface located at the portions opposite to the light emitting surface uniform are parallel lines, the light reflective objects 3 are arranged so that the distribution density of the lines increases at both corner portions remote from the fluorescent lamp 6 as shown in FIG. 4. Further, in the light emitting device according to the present invention, the light reflecting plate 4 for reflecting light in a direction perpendicular to the light emitting surface and toward the light emitting surface is provided on the light reflective objects 3. The light reflecting plate or sheet 4 is used to reflect light from the light emitting surface and is in intimate contact with the light reflective objects 3.

Figure 7:
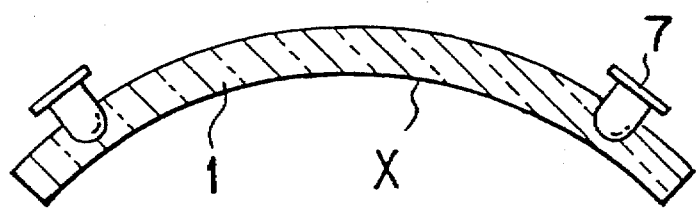
FIG. 7 is a view showing an embodiment of the invention having a curved light transmissive substrate.

The contour of the light emitting surface of the device according to the invention may be selected as desired. Also, the shape of the surface may be selected as a planar or curved surface as shown in FIG. 7. Also, it is possible to provide a colored light emitting surface by attaching a transparent color film onto the outer surface of the light emitting surface.

Figure 5:
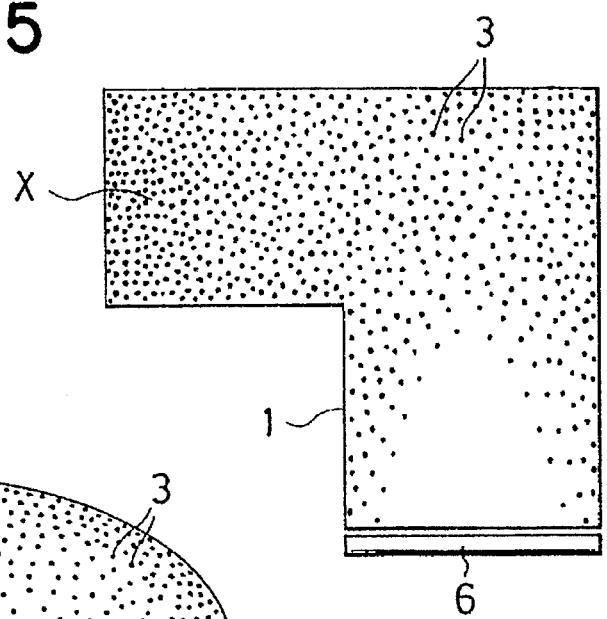
FIG. 5 is a view showing light reflecting objects in the form of a plurality of dots on a rear surface of the light emitting surface in accordance with another embodiment of the invention.

FIG. 5 shows another embodiment in which the substrate has a portion X at the light emitting surface where light of the fluorescent lamp 6 is not directly introduced. In this case, the light reflective objects 3 are provided in the foregoing method so that it is possible to provide a planar light emitting device having a light emitting surface with a uniform illumination.

Figure 6:
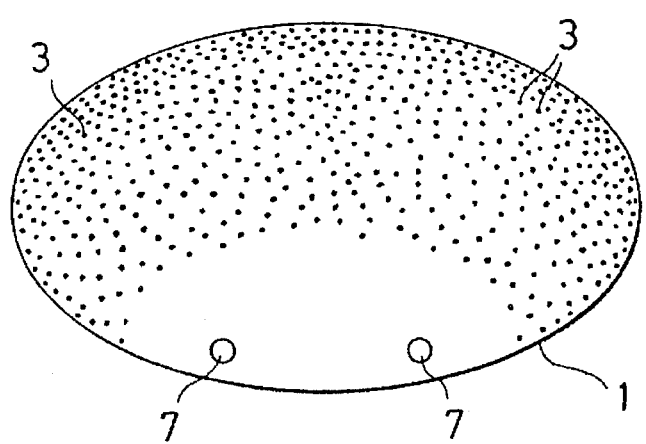
FIG. 6 is a view showing light reflecting objects in the form of a plurality of dots on a back surface of the light emitting surface in accordance with still another embodiment of the invention.

FIG. 6 shows another embodiment in which light emitting diodes 7 are provided at desired positions within the transparent resin substrate 1. In this case, the light reflective objects 3 are applied to the back surface of the light emitting surface in the foregoing method so that is possible to provide a planar light emitting device having a light emitting surface with a uniform illumination.

The foregoing description is based upon the embodiment of the desk-top type device. However, it is apparent to those skilled in the art that the invention may be easily applied to illuminate a liquid crystal display panel from its backside or to illuminate a device fixed to a wall or a device suspended from other parts. Various modifications in applying the invention are possible. Further, by covering the surface of the light emitting device with a transparent plate in which display letters or figures are formed or by covering the device with an opaque plate in which the display pattern portion is transparent, it is possible to use the device to display a sign even at night.

What is claimed is:

1. A light emitting device, comprising:

a light transmissive substrate having a light emitting surface, a rear surface and a plurality of sectors;

a light source for introducing light into said light transmissive substrate;

a light reflector disposed around a peripheral region of said light transmissive substrate, except a region where the light is introduced into the light transmissive substrate, to prevent light from leaking from said peripheral region;

a plurality of light reflective objects disposed on said rear surface of said light transmissive substrate having a distribution such that a density of said light reflective objects in each said sector is inversely proportional to an illuminance of said light within said substrate in each said sector, such that illuminance emitted from said light emitting surface in each said sector is substantially uniform, to thereby provide the light emitting device having substantially uniform illuminance.

2. The light emitting device according to claim 1, wherein said light emitting surface is planar.

3. The light emitting device according to claim 1, wherein said light source is provided in an interior portion of the substrate.

4. The light emitting device according to claim 1, wherein said light reflector is a frame extending around said light transmissive substrate, said frame having a low coefficient of reflectivity, as compared to a reflectivity of a transparent material of said light transmissive substrate.

5. The light emitting device according to claim 1, wherein said light reflective objects are lines.

6. The light emitting device according to claim 1, further comprising a metallic sheet on said rear surface of said light transmissive substrate, said metallic sheet including said light reflective objects.

7. A method of forming a light emitting device having a lamp, a light emitting surface and a rear surface, said method comprising the steps of:

forming a substantially uniform pattern of light reflecting objects on said rear surface;

introducing light into said light emitting device;

dividing said light emitting surface into a plurality of areas;

measuring an illuminance of each of said plurality of areas; and adjusting the illuminance of each of said plurality of areas by varying a density of said light reflective objects on said rear surface in each of said plurality of areas to thereby produce said light emitting device having substantially uniform illuminance.

8. The method as claimed in claim 7, wherein said adjusting step includes adding said light reflective objects to said areas, wherein said light reflective objects include at least one of dot patterns and line patterns, with said dot patterns and line patterns being at least one of coated, printed and formed on said rear surface opposite to said light emitting surface.

* * * * *